United States Patent
Anichkov et al.

(10) Patent No.: US 11,262,718 B2
(45) Date of Patent: Mar. 1, 2022

(54) METHOD AND SYSTEM FOR MANAGING MICROGRID ASSETS

(71) Applicant: MERIT SI, LLC, Annandale, NJ (US)

(72) Inventors: Dmitriy Anichkov, Somerville, NJ (US); Thomas P. Kuster, Clinton, NJ (US)

(73) Assignee: MERIT SI, LLC, Annandale, NJ (US)

( * ) Notice: Subject to any disclaimer, the term of this patent is extended or adjusted under 35 U.S.C. 154(b) by 102 days.

(21) Appl. No.: 16/621,274

(22) PCT Filed: May 31, 2018

(86) PCT No.: PCT/US2018/035321
§ 371 (c)(1),
(2) Date: Dec. 11, 2019

(87) PCT Pub. No.: WO2019/005412
PCT Pub. Date: Jan. 3, 2019

(65) Prior Publication Data
US 2020/0133220 A1   Apr. 30, 2020

Related U.S. Application Data

(60) Provisional application No. 62/527,483, filed on Jun. 30, 2017.

(51) Int. Cl.
*G05B 19/042* (2006.01)
*G06Q 40/04* (2012.01)
*G06Q 50/06* (2012.01)

(52) U.S. Cl.
CPC .... *G05B 19/042* (2013.01); *G05B 2219/2639* (2013.01)

(58) Field of Classification Search
CPC .......... G05B 19/042; G05B 2219/2639; Y02E 40/70; Y04S 10/50; G06Q 50/06
See application file for complete search history.

(56) References Cited

U.S. PATENT DOCUMENTS

| 2009/0216387 A1 | 8/2009 | Klein | 700/293 |
| 2010/0179704 A1* | 7/2010 | Ozog | H02J 13/0006 700/291 |

(Continued)

FOREIGN PATENT DOCUMENTS

CN    107196294 A  *  9/2017

OTHER PUBLICATIONS

Sun et al. "A Wind Forecast Error Cost Included OPF Model and Its Fast Algorithm," National Key Basic Research Program of China, 2014. (Year: 2014).*

(Continued)

*Primary Examiner* — Chad G Erdman
(74) *Attorney, Agent, or Firm* — Ostrolenk Faber LLP

(57) ABSTRACT

A method for managing a microgrid, the microgrid having an intermittent energy source and energy storage, comprising: using a microgrid asset management system, dispatching the energy storage to maintain optimal power flow to and from a power grid by: producing a generation forecast and a generation forecast error probability distribution for an intermittent energy source coupled to the microgrid from a historic generation forecast and one or more measurements; generating random intermittent energy source generation inputs from at least one of historic generation data, the historic generation forecast, and the generation forecast error probability distribution; using the random intermittent energy source generation inputs, calculating a microgrid performance value using a microgrid performance model and a microgrid financial value using a microgrid financial model; and, selecting an energy storage dispatch scenario to optimize operation of the microgrid using at least one of the microgrid performance value and the microgrid financial value.

20 Claims, 10 Drawing Sheets

(56) References Cited

U.S. PATENT DOCUMENTS

2012/0143385 A1 6/2012 Goldsmith .................. 700/297
2014/0018969 A1 1/2014 Forbes, Jr. .................. 700/295
2016/0233682 A1 8/2016 Do Rosario et al.

OTHER PUBLICATIONS

International Search Report dated Aug. 8, 2018 in corresponding PCT International Application No. PCT/US2018/035321.
Written Opinion dated Aug. 8, 2018 in corresponding PCT International Application No. PCT/US2018/035321.
ISO 55000:2014(en), Asset management—Overview, principles and terminology, URL address; https://www.iso.org/obp/ui/#iso:std:iso:55000:ed-1:v2:en, download date: Apr. 15, 2017.
Microgrid Workshop Report, Aug. 2011, URL address: https://www.energy.gov/sites/prod/files/Microgrid%20Workshop%20Report%20August%202011.pdf, download date: Apr. 15, 2017.
Home-System Advisor Model (SAM), URL address: https://sam.nrel.gov/, download date: Apr. 16, 2017.
A. Nottrott et al., "Energy dispatch schedule optimization and cost benefit analysis for grid-connected, photovoltaic-battery storage systems," Renewable Energy, vol. 55, Jul. 2013, pp. 230-240, URL address: http://maeresearch.ucsd.edu/kleissl/pubs/Nottrottetal2011_ValueOfLiB_final.pdf, download date: Dec. 10, 2019.
Y. Liu et al., "Energy Management for Grid-connected Micro Grid with Renewable Energies and Dispatched Loads," URL address: http://www.pe.org.pl/articles/2012/5b/21.pdf, download date: Apr. 15, 2017.
Net Present Value (NPV), URL address: https://www.investopedia.com/terms/n/npv.asp, download date: Dec. 9, 2019.
RMI—The Economics of Battery Energy Storage—Full Report—Final, URL address: https://rmi.org/wp-content/uploads/2017/03/RMI-TheEconomicsOfBatteryEnergyStorage-FullReport-FINAL.pdf, download date: Dec. 3, 2019.
Short-Term Load Forecasting Error Distributions and Implications for Renewable Integration Studies, URL address: http://home.engineering.iastate.edu/~jdm/wesep594/NickBrownPaperSpring2014.pdf, download date: May 1, 2017.

* cited by examiner

METHOD AND SYSTEM FOR MANAGING MICROGRID ASSETS

CROSS-REFERENCE TO RELATED APPLICATIONS

The present application is a 35 U.S.C. §§ 371 national phase conversion of PCT/US2018/035321, filed May 31, 2018, which claims priority to U.S. Provisional Patent Application No. 62/527,483, filed Jun. 30, 2017, the contents of all of which are incorporated herein by reference. The PCT International Application was published in the English language.

FIELD OF THE INVENTION

This invention relates to the field of asset management systems, and more specifically, to a method and system for managing microgrid assets.

BACKGROUND OF THE INVENTION

The term "asset management" is defined in ISO 55000 as the "coordinated activity of an organization to realize value from assets." (See "Asset Management—Overview, Principles and Terminology"; https://www.iso.org/obp/ui/#iso:std:iso:55000:ed-1:v2:en; accessed Apr. 15, 2017; and incorporated herein by reference.) In addition, the term "asset management system" refers to a system that monitors and maintains things of value, and more specifically, that monitors and maintains a microgrid to realize its value. Furthermore, the term "microgrid" is defined by the U.S. Department of Energy Microgrid Exchange Group as "a group of interconnected loads and distributed energy resources (DERs) within clearly defined electrical boundaries that acts as a single controllable entity with respect to the grid." (See DOE Microgrid Workshop Report, 2011; https://energy.gov/sites/prod/files/Microgrid%20Workshop%20Report%20August%202011.pdf; accessed Apr. 15, 2017; and incorporated herein by reference.)

DERs typically include energy storage, energy loads, and intermittent energy sources, such as solar photovoltaic ("PV") and wind sources. DERs are typically designed utilizing performance and financial models such as the System Advisor Model ("SAM") provided by the National Renewable Energy Laboratory ("NREL") for the U.S. Department of Energy ("DOE"). (See NREL, System Advisor Model (SAM); https://sam.nrel.gov/; accessed on Apr. 16, 2017; and incorporated herein by reference.) The SAM performance and cost of energy for power projects are based on installation and operating costs and system design parameters.

The SAM instruction manual describes its models as follows. "SAM's performance model make hour-by-hour calculations of project's electric output, generating a set of 8,760 hourly values that represent the system's electricity production over a single year." In addition, SAM uses hourly or sub-hourly data. Furthermore, "The performance models use data from a weather file to represent the renewable resource and ambient weather conditions that affect the system's performance. The NREL National Solar Radiation Database (NSRDB) contains satellite-derived data from the Physical Solar Model (PSM) in weather files in the SAM CSV format for both typical year data and historical single year data. A typical year file uses a single year of hourly data to represent the renewable resource and weather conditions over a multi-year period. The typical year methodology involves analyzing a multi-year data set and choosing a set of 12 months from the multi-year period that best represent typical conditions over the long-term period. For example, a typical year file developed from a set of data for the years 1998-2005, might use data from 2000 for January, 2003 for February, 1999 for March etc. Annual simulation results from typical year weather data are suitable for long-term economic analysis. Single year data represents the weather at a location for a specific year. Single year data is appropriate for analysis of a system's performance in a particular year, and may be appropriate for analyses involving time-dependent electricity pricing or electric loads for a given year." Finally, "SAM's financial model calculates financial metrics for various kinds of power projects based on a project's cash flows over an analysis period that you specify. The financial model uses the system's electrical output calculated by the performance model to calculate the series of annual cash flows."

Now, stochastic simulations allow for the examination of the effect of uncertainty in the value of one or more input variables on an output metric. One problem with existing simulation approaches is that they do provide for solving the asset management optimization problem, specifically, DER optimum sizing and economic dispatching.

For example, Nottrott et al. describe a linear programming ("LP") routine implemented to model optimal energy storage dispatch schedules for peak net load management and demand charge minimization in a grid-connected, combined photovoltaic-battery storage system. However, one problem with this approach is that the uncertainty in the load forecast was simply simulated by incorporating random, normally distributed fluctuations with a standard deviation of 5% of the magnitude of the load. (See A. Nottrott, J. Kleissl, B. Washom, "Energy dispatch schedule optimization and cost benefit analysis for grid-connected, photovoltaic-battery storage systems"; http://www.sciencedirect.com/science/article/pii/S0960148112008026; accessed Apr. 15, 2017; and incorporated herein by reference.)

As another example, Liu et al. describe management of a micro grid with renewable generation and energy storage. Their objective "to minimize energy cost based on forecasting of loads, prices and renewable generations and was solved with genetic algorithm and pattern search methods." Furthermore, it proposes Monte Carlo methods to solve the uncertainty problems. (See Yujiao LIU, Chuanwen JIANG, Jingshuang SHEN, Xiaobin ZHOU, "Energy Management for Grid-Connected Micro Grid with Renewable Energies and Dispatched Loads"; http://www.pe.org.pl/articles/2012/5b/21.pdf; accessed Apr. 15, 2017; and incorporated herein by reference.) One problem with this approach is that it assumes that prediction errors follow a fixed distribution. However, obviously, prediction errors largely depend on the forecast horizon and microgrid operating conditions such as hour of the day, day of the week, seasonality, and weather patterns.

Another problem with such existing approaches is that they typically do not react to prediction errors.

A need therefore exists for an improved method for system for managing microgrid assets. Accordingly, a solution that addresses, at least in part, the above and other shortcomings is desired.

SUMMARY OF THE INVENTION

According to one aspect of this invention, there is provided a method for managing a microgrid, the microgrid having an intermittent energy source and energy storage coupled thereto, the method comprising: using a microgrid asset management system, dispatching the energy storage to maintain optimal power flow to and from a power grid coupled to the microgrid by: producing a generation forecast and a generation forecast error probability distribution for an intermittent energy source coupled to the microgrid from a historic generation forecast and one or more measurements; generating random intermittent energy source generation inputs from at least one of historic generation data, the historic generation forecast, and the generation forecast error probability distribution; using the random intermittent energy source generation inputs, calculating a microgrid performance value using a microgrid performance model and a microgrid financial value using a microgrid financial model; and, selecting an energy storage dispatch scenario to optimize operation of the microgrid using at least one of the microgrid performance value and the microgrid financial value.

In accordance with further aspects of the invention, there is provided an apparatus such as an information system, a microgrid asset management system, etc., a method for adapting these, as well as articles of manufacture such as a computer readable medium or product and computer program product or software product (e.g., comprising a non-transitory medium) having program instructions recorded thereon for practicing the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE EXAMPLE EMBODIMENTS

In the following description, the details are set forth to provide an understanding of the invention. In some instances, certain software, circuits, structures and methods have not been described or shown in detail in order not to obscure the invention. The term "information system" or "system" is used herein to refer to any machine for processing data, including the microgrid asset management systems, control systems, controllers, computer systems, and network arrangements described herein. The present invention may be implemented in any computer programming language provided that the operating system of the data processing system provides the facilities that may support the requirements of the present application. Any limitations presented would be a result of a particular type of operating system or computer programming language and would not be a limitation of the present invention. The present invention may also be implemented in hardware or in a combination of hardware and software.

According to one embodiment of the invention, there is provided an improved method and system for managing microgrid assets including DER optimal characterization and economic dispatch by solving uncertainty problems based on accurate forecast error distributions while providing reaction on prediction errors based on variable measurement. In particular, according to one embodiment, there is provided a method for managing microgrid assets, wherein the microgrid is connected to a power grid, the microgrid having an energy storage and an intermittent energy source dependent on environmental variables, the energy storage optimally characterized and optimally dispatched based on one or more of an environmental variable forecast, a microgrid performance model, a microgrid financial model, and microgrid operating conditions.

Figure 1:
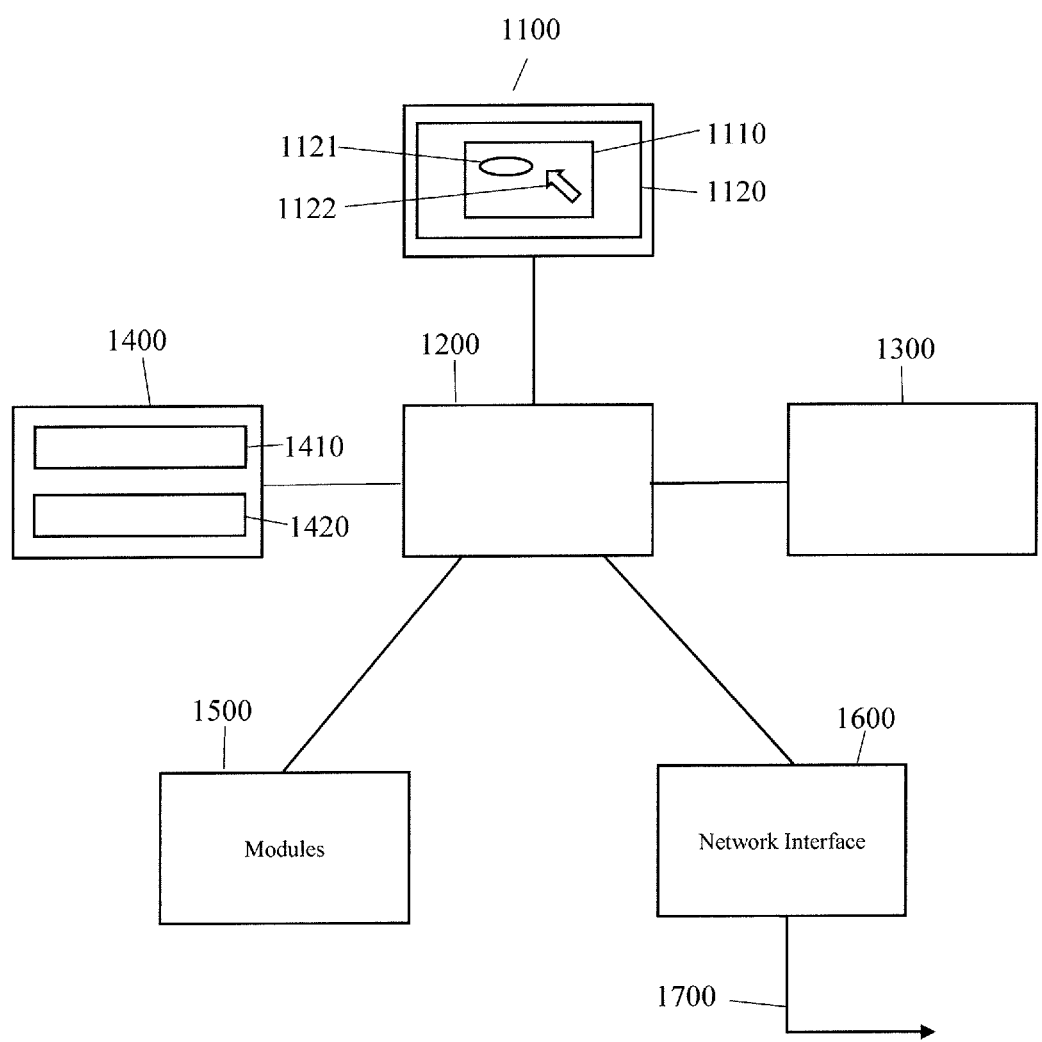
FIG. 1 is a block diagram illustrating an information system in accordance with an embodiment of the invention.

FIG. 1 is a block diagram illustrating an information system 1000 in accordance with an embodiment of the invention. The information system 1000 is suitable for monitoring and maintaining a microgrid and for performing as an microgrid asset management system (e.g., 2310, 3310, 4310), control system, supervisory control and data acquisition ("SCADA") system, energy management system, or the like. The information system 1000 may be implemented as a virtual machine. The information system 1000 may be a client and/or a server in a client-server configuration. As an example, the information system 1000 may be a server and/or a personal computer. The information system 1000 may be a distributed system deployed on multiple processors or hosts.

The information system 1000 includes a display 1100, a processor or CPU 1200, an input device 1300, memory 1400, and an interface device 1600. The display 1100 may include a computer screen or a television screen. The CPU 1200 is coupled to a memory 1400 that stores an operating system 1420 to manage the information system 1000. The CPU 1200 is operatively coupled to an input device 1300 for receiving user commands and to the display 1100 for displaying the results of these commands to a user. These commands may also be received over a network 1700 via the interface device 1600. The CPU 1200 may operate in association with dedicated co-processors, memory devices, or other hardware modules 1500. The input device 1300 may include a keyboard, mouse, touchpad, or the like. The memory 1400 may include a plurality of storage devices including an internal memory and an external storage device. For example, memory 1400 may include databases, random access memory, read-only memory, flash drives, and/or hard disk devices. The information system 1000 may include a database management system and a database 1410 and can be stored in the memory 1400 of the information system 1000. The interface device 1600 may include one or more network connections. The information system 1000 may be adapted to communicate with other information systems over a network 1700 (see 2150, 3150, and 4150 in FIGS. 2, 3, and 4, respectively) via the interface device 1600. For example, the interface device 1600 may include an interface to a network 1700 such as the Internet and/or a wireless network. Thus, the interface 1600 may include suitable transmitters, receivers, connectors, and the like. The information system 1000 may be associated with other information systems over the network 1700. Of course, the information system 1000 may include additional software and hardware, the description of which is not necessary for understanding the invention.

The information system 1000 includes programmed computer-executable instructions to implement embodiments of the present invention. The instructions may be embodied in one or more hardware modules 1500 or program (software) modules (e.g., 1420) resident in the memory 1400 of the information system 1000. Alternatively, programmed instructions may be embodied on a machine-readable medium or product such as one or more DVDs, CDs etc.

A user may interact with the information system 1000 using a user interface ("UI") 1120 such as a graphical user interface. The UI 1120 may be used for monitoring, managing, and accessing the information system 1000. Typically, a UI is used to display information to and receive commands from users and includes a variety of controls including icons, drop-down menus, toolbars, text, buttons, and the like. A user interacts with the UI 1120 presented on a display 1100 by using an input device 1300 to position a pointer or cursor 1122 over a graphical object, for example, an icon, menu, etc. 1121 and by selecting the object 1121. Typically, UI elements are presented in windows 1110, a rectangular area within the display 1100. A window 1110 may be open, closed, displayed full screen, reduced in size, or moved to different areas of the display 1100.

Figure 2:
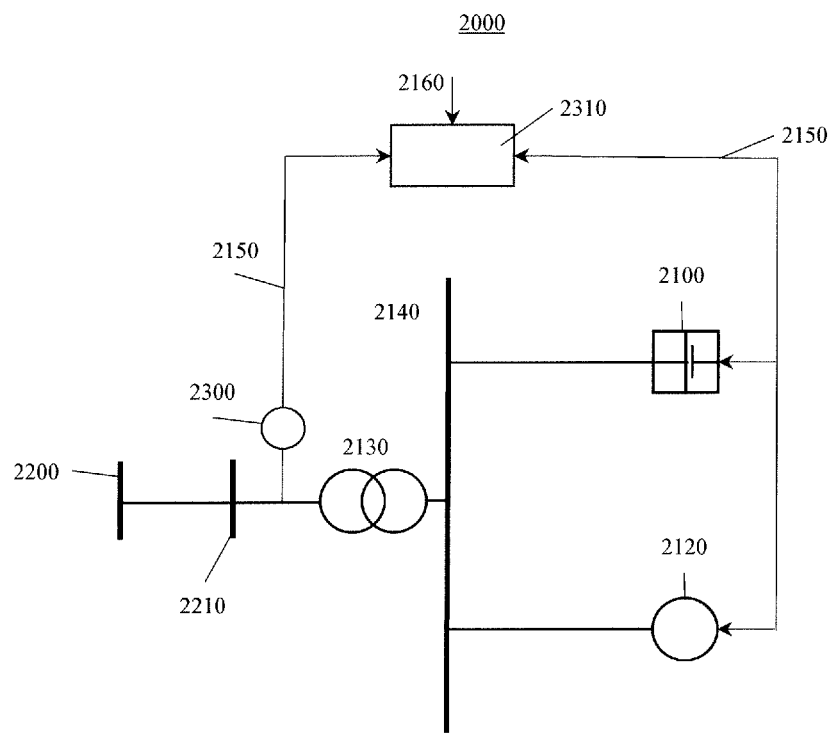
FIG. 2 is a block diagram illustrating a microgrid in accordance with an embodiment of the invention.

FIG. 2 is a block diagram illustrating a microgrid 2000 in accordance with an embodiment of the invention. The microgrid 2000 is interconnected with a utility grid 2200 at a point of common coupling 2210. According to one embodiment of the invention, there is provided a method for managing assets of the microgrid (or microgrid assets) including an intermittent energy source 2120 and an energy storage (device) 2100. The intermittent energy source 2120 and the energy storage 2100 are connected to the utility grid 2200 via a small network including a bus 2140 and a power transformer 2130. It will be understood by those skilled in the art that a microgrid 2000 may typically include a plurality of intermittent energy sources 2120 and energy storages 2100. The intermittent energy source 2120 may include, for example, solar photovoltaic modules or wind turbines. The energy storage 2100 may include compressed air energy storage, flywheel energy storage, pumped hydroelectric storage, electromagnetic capacitors, supercapacitors, superconducting magnetic energy storage, flow batteries, rechargeable batteries, or any other type of energy storage device.

In FIG. 2, only a part of the microgrid 2000 is shown in detail while the rest of its structure is schematically represented by reference number 2160 (and reference numbers 3160 and 4160 in FIGS. 3 and 4, respectively) including other microgrid components. It will be understood by those skilled in the art that microgrid 2000 may include one or more dispatchable energy sources, capacitors and reactors, power collectors, and/or other power devices.

Referring again to FIG. 2, the microgrid 2000 includes an asset management system 2310 (e.g., information system 1000) adapted to implement a subset of asset management functions and is typically referred as an energy management system. The system 2310 manages power generation and consumption within the microgrid 2000. The system 2310 typically acquires power properties at the point of common coupling 2210 through a power monitor 2300 (3300 in FIGS. 3 and 4300 in FIG. 4). The power properties include but are not limited to active and reactive power flow, voltage, power factor, current, and system frequency. The power monitor 2300 may be a power meter, a smart meter, a relay protection device, or any other device for performing power monitoring. It will be understood by those skilled in the art that the system 2310 may acquire properties from multiple microgrid devices as well as information from outside of the microgrid 2000. The system 2310 manages energy storage 2100 sending active and reactive power, voltage, power factor, start and stop and other commands, and acquiring active and reactive power, voltages, power factor, status and other information from the energy storage 2100. The system 2310 manages the intermittent energy source 2120 sending active and reactive power, voltage, power factor, start and stop and other commands, and acquiring active and reactive power, voltages, power factor, status and other information from the intermittent energy source 2120. It will be understood by those skilled in the art that the system 2310 may manage other devices described above. To send commands and acquire information, the system 2310 communicates with the microgrid devices 2300, 2100, 2120 and other devices over a computer network or network 2150 (3150 in FIGS. 3 and 4150 in FIG. 4).

Figure 3:
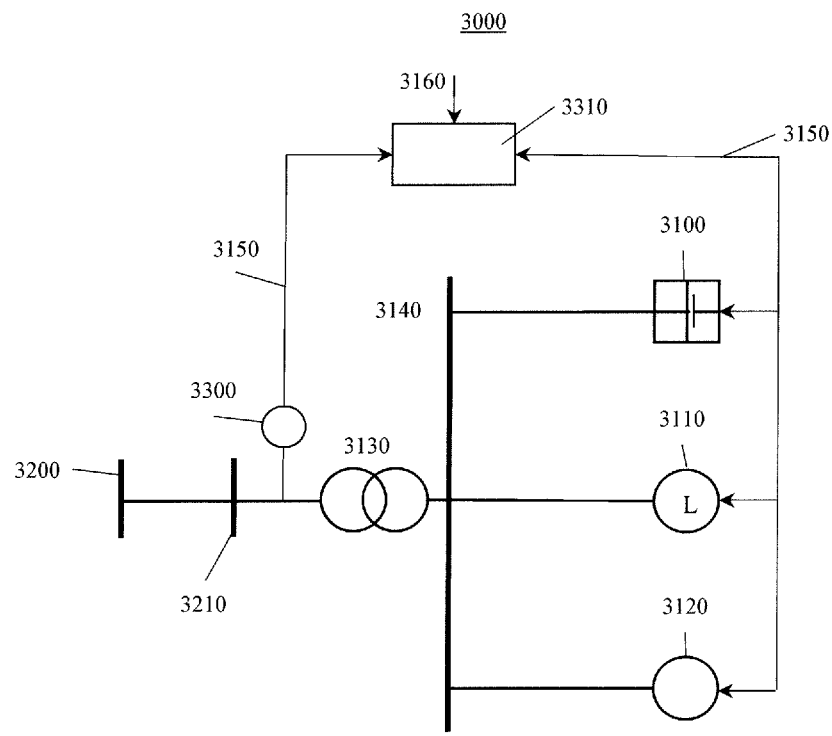
FIG. 3 is a block diagram illustrating a microgrid in accordance with another embodiment of the invention.

FIG. 3 is a block diagram illustrating a microgrid 3000 in accordance with another embodiment of the invention. The microgrid 3000 is interconnected with a utility grid 3200 at a point of common coupling 3210. According to this embodiment of the invention, there is provided a method for managing microgrid assets including an intermittent energy source 3120, an energy load 3110, and an energy storage (device) 3100. The intermittent energy source 3120, the energy load 3110, and the energy storage 3100 are connected to the utility grid 3200 via a small network including a bus 3140 and a power transformer 3130. It will be understood by those skilled in the art that a microgrid 3000 may typically include a plurality of intermittent energy sources 3120, energy loads 3110, and energy storages 3100. The intermittent energy source 3120 may include, for example, solar photovoltaic modules or wind turbines.

Some of the energy load 3110 may be controllable by the microgrid asset management system or controller 3310. The energy load 3110, for example, may be a water treatment plant for processing water with one or more of the following methods: distillation, multi-stage flash distillation, multiple effect distillation, vapor compression distillation, reverse osmosis, or any other water treatment method. As another example, the energy load 3110 may be a natural gas compressor station. In this case, the controller 3310 sets gas compressor variable-frequency drive power reference values or set points.

Figure 4:
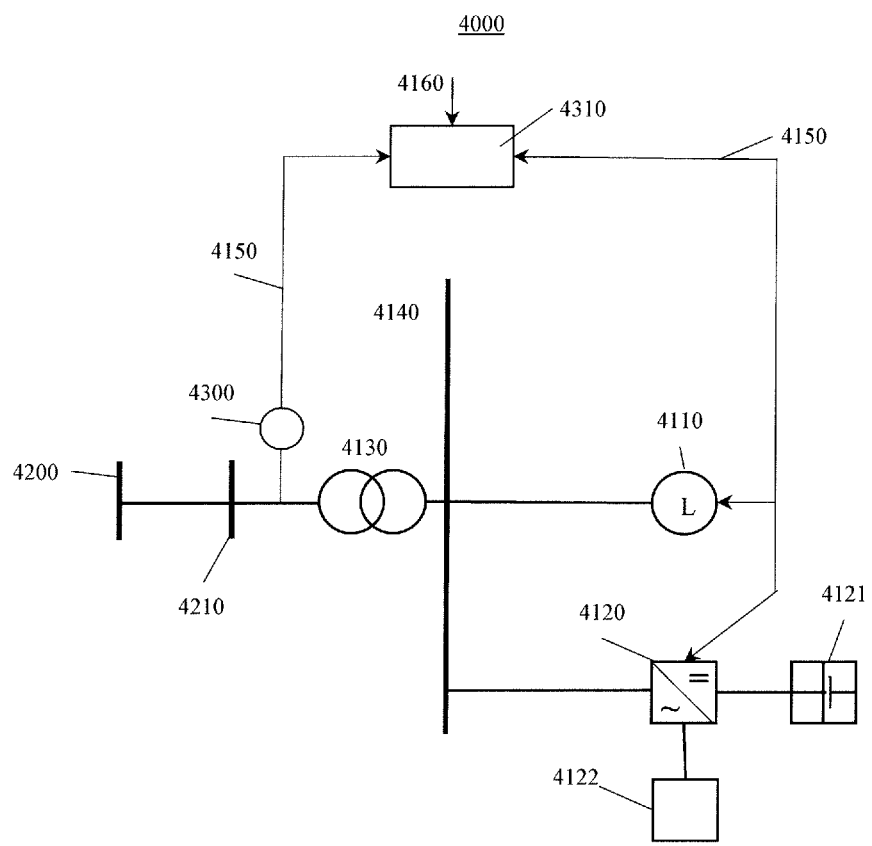
FIG. 4 is a block diagram illustrating a microgrid in accordance with another embodiment of the invention.

FIG. 4 is a block diagram illustrating a microgrid 4000 in accordance with another embodiment of the invention. The microgrid 4000 is interconnected with a utility grid 4200 at a point of common coupling 4210. According to this embodiment of the invention, there is provided a method for managing microgrid assets including an energy load 4110, an intermittent energy source 4122, and an energy storage 4121 coupled to the microgrid 4000 via an inverter 4120. The intermittent energy source 4122 and the energy storage 4121 are coupled to the inverter 4120 via DC links. It will be understood by those skilled in the art that a microgrid 4000 may typically include a plurality of intermittent energy sources 4122, energy loads 4110, energy storages 4121, and power inverters 4120. The intermittent energy source 4122 may include, for example, solar photovoltaic modules or wind turbines.

The microgrid asset management system 2310, 3310, 4310 is adapted to optimally manage the microgrid 2000, 3000, 4000. According to one embodiment, this is performed by maximizing or solving an objection function. The objective function to maximize or solve may be net present value ("NPV"), that is, the difference between the present value of cash inflows and the present value of cash outflows:

$$NPV = \sum_{t=1}^{T} \frac{C_t}{(1+r)^t} - C_o$$

where
$C_t$=net cash inflow during the period t
$C_o$=total initial investment costs
r=discount rate, and
t=number of time periods
(For reference see http://www.investopedia.com/terms/n/npv.asp, which is incorporated herein by reference.)

It will be understood by those skilled in the art that the role of the objective function may be to maximize net present value, minimize total life-cycle cost, minimize levelized cost of energy, maximize internal rate of return, minimize discounted payback period, or any other objective function.

According to one embodiment, the microgrid (e.g. 2000) may participate in the following services (See Fitzgerald, Garrett, James Mandel, Jesse Morris, and Hervé Touati, "The Economics of Battery Energy Storage: How Multi-Use, Customer-Sited Batteries Deliver the Most Services and Value to Customers and the Grid", Rocky Mountain Institute, September 2015, <<http://www.rmi.org/electricity_battery_value>>, accessed May 1, 2017, and incorporated herein by reference):

ISO/RTO services including energy arbitrage, frequency regulation, spin/non-spin reserves, voltage support, and black start;
Utility services including resource adequacy, distribution deferral, transmission congestion relief, and transmission deferral; and,
Customer services including time-of-use bill management, increased PV self-consumption, demand charge reduction, and backup power.

It will be understood by those skilled in the art that microgrids 2000 may participate in any of the services listed above, as well as any other applicable service and may participate in multiple services at the same time or over a given period of time.

Microgrid (e.g., 2000) dispatch, and specifically, energy storage (e.g., 2100) dispatch, as one of the microgrid components is important for optimally managing a microgrid 2000 providing the above described services.

Figure 5:
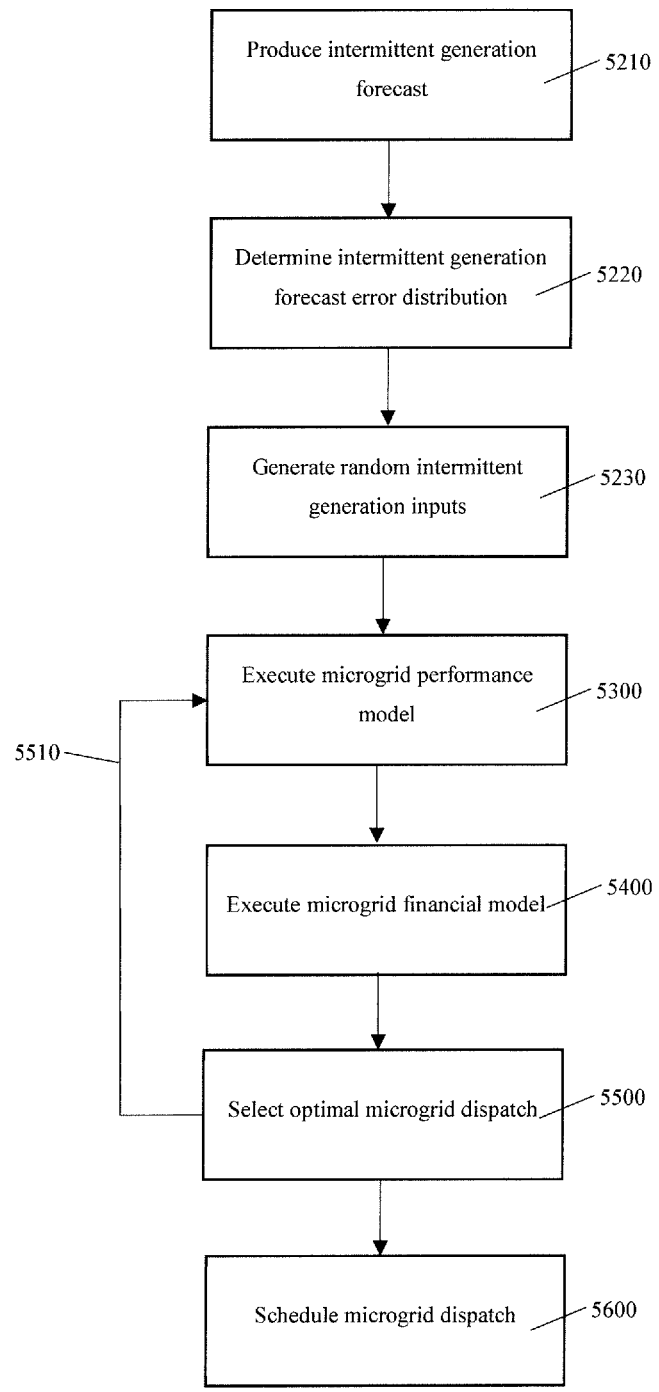
FIG. 5 is a flow chart illustrating operations of modules within an information system for optimally dispatching a microgrid in accordance with an embodiment of the invention.

FIG. 5 is a flow chart illustrating operations of modules within an information system (e.g., 1000, 2310) for optimally dispatching a microgrid (e.g., 2000) in accordance with an embodiment of the invention. The flow chart or diagram includes steps or operations for the production of an intermittent generation forecast 5210, determination of a forecast error distribution 5220, and generation of random inputs 5230. The random inputs are sent to a performance model 5300 for the microgrid 2000. The performance model 5300 produces modeling results for a financial model 5400 for the microgrid 2000. An optimal microgrid dispatch module 5500 determines a dispatch scenario corresponding to the objective function specified above and communicates the dispatch scenario to a microgrid scheduler 5600 for further processing. An iterative process 5510 runs until the optimal dispatch scenario is found. The dispatch scenario is defined for multiple steps of a predetermined or specified time horizon, for example, hourly steps for day-ahead dispatch. The above described steps may be executed on a configurable time schedule and/or input change, such as GHI and ambient temperature measurement and forecast updates. The determination of a forecast error distribution 5220 and the generation of random inputs 5230 following a Monte Carlo method are intended to deal with the uncertainty of intermittent power generation, such as PV and/or wind. The above described probability distributions are assigned to each input.

Figure 6:
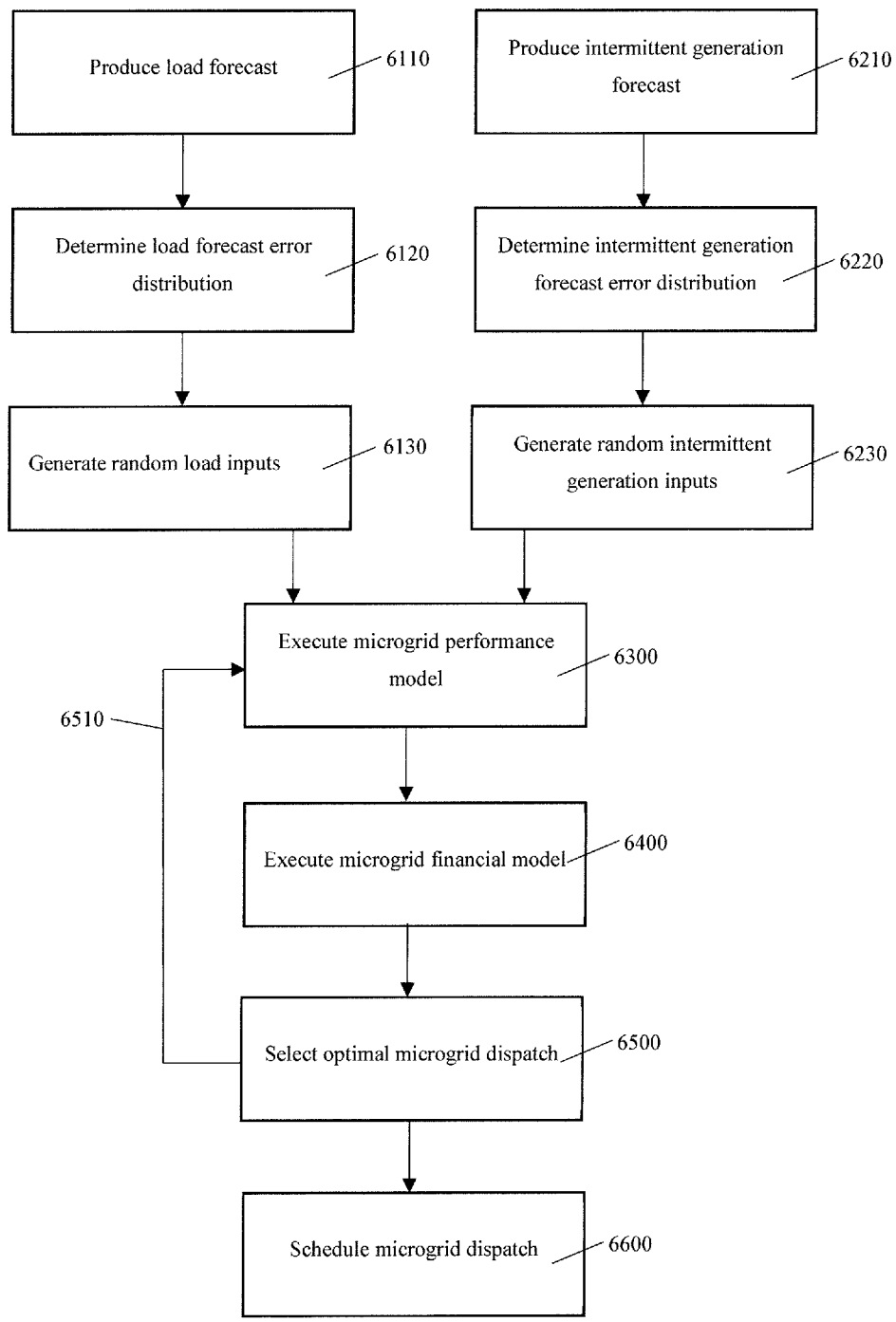
FIG. 6 is a flow chart illustrating operations of modules within an information system for optimally dispatching a microgrid in accordance with another embodiment of the invention.

FIG. 6 is a flow chart illustrating operations of modules within an information system (e.g., 1000, 3310) for optimally dispatching a microgrid 3000 in accordance with another embodiment of the invention. The flow chart or diagram includes steps or operations for the production of an intermittent generation forecast 6210, determination of a forecast error distribution 6220, and generation of random intermittent generation inputs 6230. In addition, the flow diagram includes steps or operations for load forecast production 6110, determination of a load forecast error distribution 6120, and generation of random load inputs 6130. The random load inputs 6130 and the random intermittent generation inputs 6230 are sent to a performance model 6300 for the microgrid 3000. The performance model 6300 produces modeling results for a financial model 6400 for the microgrid 3000. An optimal microgrid dispatch module 6500 selects a dispatch scenario corresponding to the objective function specified above and communicates the scenario to a microgrid scheduler 6600 for further processing. An iterative process 6510 runs until the optimal dispatch scenario is found. The above described steps may be executed on configurable time schedule and/or input change, such as GHI and ambient temperature measurement and forecast updates. The determination of a forecast error distribution 6220 and the generation of random inputs 6230 following a Monte Carlo method are intended to deal with the uncertainty of intermittent power generation, such as PV and/or wind, and power load.

It will be understood by those skilled in the art that the above method may be used to manage other uncertainties concerning, for example, intermittent generation, power load, energy pricing, and other operating conditions. In addition, for model parameter uncertainties that are not considered to be important, the parameter forecast error distribution and random inputs generation may be omitted. In this case, the forecast will serve as an input for the performance model 5300 and/or 6300.

Figure 7:
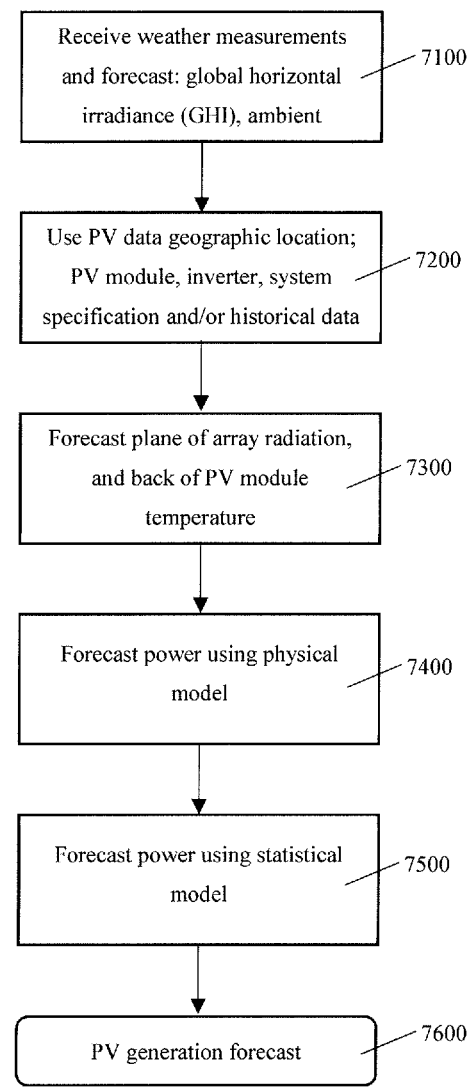
FIG. 7 is a flow chart illustrating operations of modules within an information system for producing a PV generation forecast in accordance with an embodiment of the invention.

FIG. 7 is a flow chart illustrating operations of modules within an information system (e.g., 1000, 4310) for producing a PV generation forecast in accordance with an embodiment of the invention. The flow chart or diagram illustrates in more detail steps 5210 and 6210 shown in FIGS. 5 and 6, respectively. The flow chart or diagram includes steps or operations for: receiving weather forecast global horizontal irradiance ("GHI") and ambient temperature data 7100; using PV data geographical location, PV module, inverter, and PV system specifications 7200; forecasting plane of array radiation and back of PV module temperature 7300; forecasting power using a physical model 7400; and, forecasting power using a statistical model 7500. The physical model may include an analytical performance formulation for the PV modules, DC and AC electrical wiring, and inverters. The physical model calculates hourly or sub-hourly generation based on weather data 7300 and the above described physical characteristics of the intermittent energy sources. The model may simulate any size of system from a small roof array with one inverter to a large utility scale PV system with multiple inverters. The statistical model may include various statistical methods and models including but not limited to linear and non-linear regression, naïve, average, autoregressive moving average ("ARMA"), autoregressive integrated moving average ("ARIMA"), as well as artificial intelligence methods such as artificial neural networks ("ANN"), random forests ("RRF"), and support vector machines ("SVM").

It will be understood by those skilled in the art that an intermittent generation forecast may be performed by physical models 7400, or statistical models 7500, or any combination of the above described models. The PV generation forecast 7600 may be produced for multiple time horizons, for example: 5, 10, 15 up to 60 minutes; 1 hour; 2 hours; and, up to one week horizons.

Figure 8:
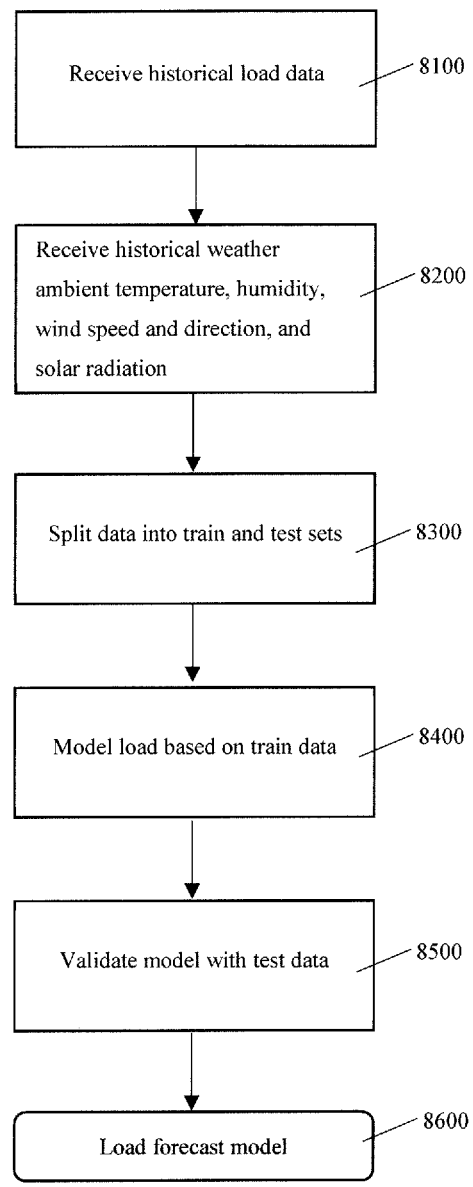
FIG. 8 is a flow chart illustrating operations of modules within an information system for generating a microgrid load forecast in accordance with an embodiment of the invention.

FIG. 8 is a flow chart illustrating operations of modules within an information system (e.g., 1000, 2310, 3310, 4310) for generating a microgrid load forecast in accordance with an embodiment of the invention. The flow chart or diagram includes steps or operations for: receiving historical load data 8100; receiving historical weather ambient temperature, humidity, wind speed and direction, and solar irradiation 8200 data; splitting data into a train set and a test set 8300; model load using train data 8400; and, validating a load model with test data 8500. According to one embodiment, the data is split 8300 with, for example, 10-fold validation, then the data is cleaned to remove outliers and preprocessed using any combination of power transforms, Box-Cox transformation, wavelet transform, principal component analysis ("PCA"), or any other relevant data preprocessing method. The modeling step 8400 may use any combination of various statistical methods and models including but not limited to linear and non-linear regression, naïve, average, autoregressive moving average ("ARMA"), autoregressive integrated moving average ("ARIMA"), as well as artificial intelligence methods such as artificial neural networks ("ANN"), random forests ("RRF"), and support vector machines ("SVM"). The load forecast model 8600 is used for load forecasting 6110 with inputs including load data, ambient temperature, humidity, wind speed and direction, and solar radiation measurements and forecasts. The load forecast may be produced for multiple time horizons, for example: 5, 10, 15 up to 60 minutes; 1 hour; 2 hours; and, up to one week horizons.

According to one embodiment, the intermittent generation forecast and load forecast models are validated by assessing their mean absolute percentage error ("MAPE") given by:

$$MAE = \frac{\sum_{i=1}^{n} |y_i - x_i|}{n},$$

where $y_i$ is the prediction and $x_i$ the measured value for n forecasts.

The models may be validated using mean absolute percentage error ("MAPE"), normalized mean absolute error ("NMAE"), or any other relevant statistical measure.

Figure 9:
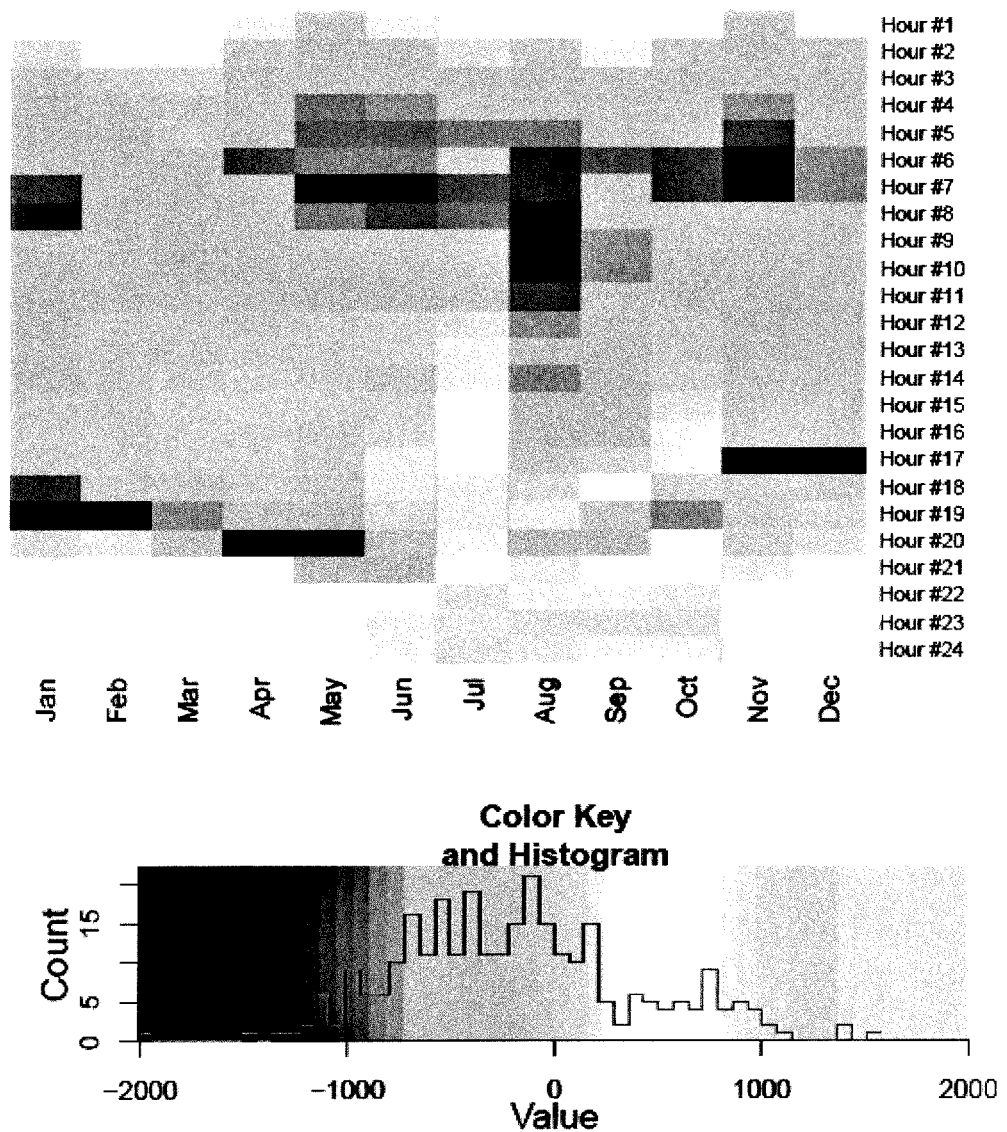
FIG. 9 is a heat map illustrating the mean CAISO two-day-ahead forecast errors for each hour of the day per month of the year in accordance with an embodiment of the invention; and, FIG. 10 is a flow chart illustrations operations of modules within an information system for determining microgrid intermittent energy source and energy storage characteristics in accordance with an embodiment of the invention.

FIG. 9 is a heat map illustrating the mean CAISO two-day-ahead forecast errors for each hour of the day per month of the year in accordance with an embodiment of the invention. (See B. M. Hodge, D. Lew, and M. Milligan, "Short-Term Load Forecasting Error Distributions and Implications for Renewable Integration Studies", NREL, 2013; http://www.nrel.gov/docs/fy13osti/57340.pdf; accessed May 1, 2017; and incorporated herein by reference). As is clear from the heat map of FIG. 9, a load forecast error varies based on season, hour of the day, and day of the week. Furthermore, the load forecast error varies based on forecast horizon and operating parameters such as ambient temperature, humidity, wind speed and direction, and solar radiation.

Referring again to FIG. 6, historical forecast data (e.g., 6110, and 6220) with associated measurements may be used to produce forecast error distributions. The distribution function of forecast errors, for example loads, is given by the following: $F(x)=Nx/N$, where N is the total number of forecast errors and Nx is the number of errors smaller than x.

Typically forecast statistical error distributions may be characterized by mean, standard deviation, skewness as a measure asymmetry, kurtosis, as a measure of thickness of the tails, as well as other relevant statistical measures. The error distribution can fit a normal (Gaussian) distribution or other alternative distributions such as hyperbolic or Pearson types I through VI. Since error distribution statistical properties vary based on microgrid operating conditions, historical forecast error data may be partitioned, whereas error distributions are determined separately for each partition. Furthermore, data partitioning may be optimized based on forecast error distribution similarity, asset management goal as described above, or other methods. Historical forecast data may be selected from intermittent energy sources and/or energy loads with similar operating conditions. For example, data used to determine a PV generation forecast error and its distribution may be used from a site in geographical proximity to the microgrid and of similar size.

Referring again to FIGS. 5 and 6, based on Monte Carlo methods, random inputs are generated from forecast values by adding a random error. The random error is generated from the forecast error distribution described above and a random number.

Referring to again to FIG. 5, the microgrid performance model 5300 includes electrical system models comprising energy storage, collectors, buses, shunt capacitors and reactors, and other relevant components. The performance model calculates hourly or sub-hourly power flow at the point of common coupling (e.g., 3210) as well as other operational parameters important for microgrid asset management and based on energy load and intermittent power generation. The energy storage model allows for analyzing the performance of battery storage devices with lead-acid, lithium-ion, vanadium redox flow, and batteries with other chemistries. The model accounts for voltage variation with charge state, capacity fade with cycling, temperature effects on capacity, and degrade over time. The model may represent a battery connected on the AC side (e.g., 2100, and 3100) or DC side (e.g., 4121) of an intermittent generator.

Referring again to FIG. 5, the financial model 5400 calculates the microgrid cash flow over a specified time. The cash flow captures the value of electricity generated by the microgrid system and incentives, and the cost of installation, operation and maintenance, taxes, and debt. The financial models can represent: residential and commercial projects that buy and sell electricity at retail rates and displace purchases of power from the grid; and, power purchase agreement ("PPA") projects that sell electricity at a wholesale rate to meet internal rate of return requirements. Residential and commercial projects that buy and sell power at retail rates may be financed through a loan or cash payment. These projects recover investment costs by selling electricity at rates established by the electricity service provider. The model may account for macro-economic variables such as interest rate and oil price forecasts. The model may calculate levelized costs of energy which represent the cost of installing and operating the microgrid system, including debt and tax costs, and accounting for incentives. The model may also calculate the net present value of after-tax cash flows and a payback period representing the number of years required for the cumulative after-tax cash flows to cover the initial equity investment in the project. The model's electricity rate structure may include flat buy and sell rates, time-of-use energy charges, monthly demand charges, tiered rates, and fixed monthly charges. PPA projects sell electricity at a price negotiated through a PPA to meet a set of equity return requirements. The model calculates IRRs and NPVs for the project. The model may also accommodate other scenarios such as partnership flip with or without debt, sale leaseback, and others.

Referring again to FIG. 5, the module 5500 for selecting optimal microgrid dispatch from multiple Monte Carlo scenarios based on the objective function provides selected service functions as described herein. Energy storage dispatch determines the timing of battery charge and discharge as well as battery discharge limits.

It will be understood by those skilled in the art that the optimization algorithm may include generic algorithms, parent search or other applicable optimization algorithms or combinations thereof. Optimization may include controllable loads. For example, natural gas compressor station optimization may include the optimization of VFD, compressor, and pipeline operations.

Referring again to FIG. 5, the scheduler 5600 implements a microgrid dispatch schedule produced by the optimal microgrid dispatch selector 5500 and compensates for forecast errors in real-time. A system operator may acknowledge a schedule receipt allowing its execution by the scheduler. The system operator may manually stop the scheduler preventing future schedule execution and/or may override current schedule parameters. The schedules may include: start time (i.e., the time the schedule starts); function, such as energy storage charge or discharge, set minimum or maximum voltage at a point of control (e.g., the point of common coupling); set active power reference; set power factor reference; set power range reserved for regulation; and the like. In addition, the schedules may include multiple parameters. The scheduled function and its parameters may stay active until another schedule overrides the function and its parameters. The scheduler may send the schedule parameters to energy storages (e.g., 2100), intermittent energy sources (e.g., 2120), and other microgrid devices. The following are example schedule functions and their parameters:

Charge energy storage. Charge rate is limited by a parameter specifying storage capability per unit time. For example, charge 10% of storage capability per hour, or charge 10 kWh per hour;

Discharge energy storage. Discharge rate is limited by a parameter specifying storage capability per unit time. For example, discharge 10% of storage capability per hour, or discharge 10 kWh per hour;

Charge energy storage when microgrid buy energy rate from grid falls below lower limit. The charge rate is limited by a parameter specifying storage capability per unit time. For example, charge 10% of storage capability per hour when the buy energy rate falls below 10 $/MWh;

Discharge energy storage when microgrid sell energy rate to the grid exceeds an upper limit. The discharge rate is limited by a parameter specifying storage capability per time. For example, discharge 10% of storage capability per hour when the sell energy rate exceeds 100 $/MWh;

Charge energy storage when microgrid buy from the grid energy rate falls below a lower limit. The charge rate is proportional to the rate exceeding the limit. For example, charge 10% of storage capability per hour per 1 $/MWh buy energy rate, when the buy energy rate falls below 100 $/MWh;

Discharge energy storage when microgrid sell to the grid energy rate exceeds an upper limit. The discharge rate is proportional to the sell energy rate exceeding the limit. For example, discharge 10% of storage capability per hour per 1 $/MWh sell energy rate, when the sell energy rate exceeds 100 $/MWh; and, Discharge energy storage when microgrid power flow at the point of common coupling, commonly known as netload, exceeds a specified limit. For example, discharge energy storage to keep the netload at or below a 300 kW limit.

It will be understood by those skilled in the art that the scheduler may accommodate other schedules with various specific microgrid operating parameters.

Figure 10:
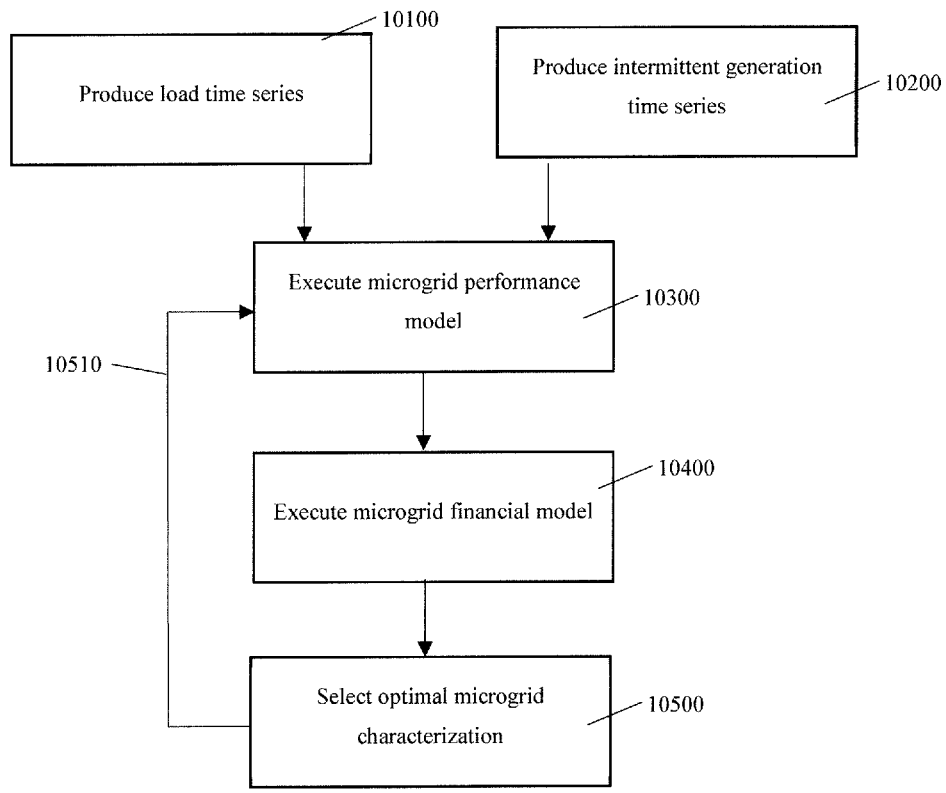

FIG. 10 is a flow chart illustrations operations of modules within an information system for determining microgrid intermittent energy source and energy storage characteristics in accordance with an embodiment of the invention. The flow diagram or chart includes steps described above for optimum energy storage dispatch for a microgrid (e.g., 3000). The flow chart or diagram includes steps or operations for: production of intermittent generation 10200 and load 10100 time series. Typically, the time series cover one year of microgrid operation, or microgrid lifecycle. The time series may be produced by a Monte Carlo method based on probability error distributions produced from historical data. The output time series 10200 and 10100 are sent to a performance model 10300 for the microgrid 3000. The performance model 10300 includes optimum microgrid dispatch functionality as described above. The performance model 10300 produces modeling results for input to a financial model 10400 for the microgrid 3000. An optimal microgrid characterization module 10500 selects a scenario corresponding to the objective function described above, for example, PV energy source size and energy storage size and chemistry. An iterative process 10510 then runs until the optimal scenario is found.

The optimal scenario described above and illustrated in FIG. 10 may serve as a performance benchmark for the real-time control mode illustrated in FIG. 5. Actual system performance is monitored and its performance is compared with the models illustrated in FIG. 5. The models may be adjusted to improve their accuracy.

Thus, according to one embodiment of the invention, there is provided a method for managing a microgrid, the microgrid having an intermittent energy source and energy storage coupled thereto, the method comprising: using a microgrid asset management system, dispatching the energy storage to maintain optimal power flow to and from a power grid coupled to the microgrid by: producing a generation forecast and a generation forecast error probability distribution for an intermittent energy source coupled to the microgrid from a historic generation forecast and one or more measurements; generating random intermittent energy source generation inputs from at least one of historic generation data, the historic generation forecast, and the generation forecast error probability distribution; using the random intermittent energy source generation inputs, calculating a microgrid performance value using a microgrid performance model and a microgrid financial value using a microgrid financial model; and, selecting an energy storage dispatch scenario to optimize operation of the microgrid using at least one of the microgrid performance value and the microgrid financial value.

While this application is primarily discussed as a method, a person of ordinary skill in the art will understand that the apparatus discussed above with reference to an information system 1000 may be programmed to enable the practice of the method of the invention. Moreover, an article of manufacture for use with an information system 1000, such as a pre-recorded storage device or other similar computer readable medium or computer program product including program instructions recorded thereon, may direct the information system 1000 to facilitate the practice of the method of the invention. It is understood that such apparatus, products, and articles of manufacture also come within the scope of the invention.

In particular, the sequences of instructions which when executed cause the method described herein to be performed by the information system 1000 may be contained in a data carrier product according to one embodiment of the invention. This data carrier product may be loaded into and run by the information system 1000. In addition, the sequences of instructions which when executed cause the method described herein to be performed by the information system 300 may be contained in a computer software product or computer program product (e.g., comprising a non-transitory medium) according to one embodiment of the invention. This computer software product or computer program product may be loaded into and run by the information system 300. Moreover, the sequences of instructions which when executed cause the method described herein to be performed by the information system 1000 may be contained in an integrated circuit product (e.g., a hardware module or modules 1420, 1500) which may include a coprocessor or memory according to one embodiment of the invention. This integrated circuit product may be installed in the information system 1000.

The embodiments of the application described above are intended to be examples only. Those skilled in the art will understand that various modifications of detail may be made to these embodiments, all of which come within the scope of the application.

What is claimed is:

1. A method for managing a microgrid, the microgrid having an intermittent energy source and energy storage coupled thereto, the method comprising:
using a microgrid asset management system, dispatching the energy storage to maintain optimal power flow to and from a power grid coupled to the microgrid by:
producing a generation forecast and a generation forecast error probability distribution for an intermittent energy source coupled to the microgrid from a historic generation forecast and one or more measurements;
generating random intermittent energy source generation inputs from historic generation data, the historic generation forecast, and the generation forecast error probability distribution;
using the random intermittent energy source generation inputs, calculating a microgrid performance value using a microgrid performance model and a microgrid financial value using a microgrid financial model; and,
selecting an energy storage dispatch scenario to optimize operation of the microgrid using at least one of the microgrid performance value and the microgrid financial value.

2. The method of claim 1, wherein the intermittent energy source includes a photovoltaic energy source.

3. The method of claim 1, wherein the intermittent energy source includes a wind turbine.

4. The method of claim 1, wherein the intermittent energy source is one or more intermittent energy sources.

5. The method of claim 1, wherein the microgrid has an energy load coupled thereto.

6. The method of claim 5, wherein the energy load is one or more energy loads.

7. The method of claim 6, further comprising:
producing a load forecast error probability distribution for the energy load from a historic load forecast and one or more measurements;
generating random energy load inputs from at least one of historic load data, the historic load forecast, and the load forecast error probability distribution;
using the energy load inputs, further calculating the microgrid performance value using the microgrid performance model and the microgrid financial value using the microgrid financial model; and,
selecting the energy storage dispatch scenario to further optimize the operation of the microgrid using at least one of the microgrid performance value and the microgrid financial value.

8. The method of claim 7, wherein the load forecast error probability distribution is produced for different time horizons.

9. The method of claim 8, wherein range definitions for the time horizons are optimized.

10. The method of claim 7, wherein the load forecast error probability distribution is produced for one or more of a time of the day, a day of the week, seasonally, and based on microgrid operating conditions including weather.

11. The method of claim 1, wherein the microgrid has coupled thereto a controllable load.

12. The method of claim 11, wherein the controllable load is one or more controllable loads.

13. The method of claim 12, further comprising controlling a power consumption of the controllable load to further optimize the operation of the microgrid.

14. The method of claim 1, wherein the microgrid has coupled thereto a dispatchable energy source.

15. The method of claim 14, wherein the dispatchable energy source is one or more dispatchable energy sources.

16. The method of claim 15, further comprising controlling a power generation of the dispatchable energy source to further optimize the operation of the microgrid.

17. The method of claim 10, further comprising:
generating random intermittent energy source generation inputs from at least one of the historic generation data, the historic generation forecast, and the generation forecast error probability distribution; and,
using the energy storage dispatch scenario, selecting optimal microgrid characteristics.

18. The method of claim 17, further comprising:
generating random energy load inputs from at least one of the historic load data, the historic load forecast, and the load forecast error probability distribution; and,
using the energy storage dispatch scenario, selecting the optimal microgrid characteristics.

19. The method of claim 1, further comprising generating an optimal schedule for the dispatching of the energy storage by compensating for uncertainties and forecast errors based on real-time measurements.

20. An asset management system for managing a microgrid, the microgrid having an intermittent energy source and energy storage coupled thereto, the asset management system comprising:
a processor coupled to memory; and,
at least one of hardware and software modules within the memory and controlled or executed by the processor, the modules including:
a module for dispatching the energy storage to maintain optimal power flow to and from a power grid coupled to the microgrid by:
producing a generation forecast and a generation forecast error probability distribution for an intermittent energy source coupled to the microgrid from a historic generation forecast and one or more measurements;
generating random intermittent energy source generation inputs from historic generation data, the historic generation forecast, and the generation forecast error probability distribution;
using the random intermittent energy source generation inputs, calculating a microgrid performance value using a microgrid performance model and a microgrid financial value using a microgrid financial model; and
selecting an energy storage dispatch scenario to optimize operation of the microgrid.

\* \* \* \* \*